United States Patent

Davis

Patent Number: 5,566,175
Date of Patent: Oct. 15, 1996

[54] ASYNCHRONOUS TRANSFER MODE DATA TRANSMISSION SYSTEM

[75] Inventor: Simon P. Davis, Romsey, England

[73] Assignee: Roke Manor Research Limited, Hampshire, England

[21] Appl. No.: 55,883

[22] Filed: May 4, 1993

[30] Foreign Application Priority Data

Jun. 11, 1992 [GB] United Kingdom ............ 9212447

[51] Int. Cl.$^6$ ............................................. H04J 3/22
[52] U.S. Cl. ............................................. 370/84; 395/250
[58] Field of Search ................................ 370/84, 60, 61, 370/17, 13, 82, 83, 85.7, 95.1, 109, 110, 94.1, 118, 110.1; 375/122, 240; 395/250, 550, 725, 856, 876, 877, 880; 340/825.15; 364/401, 402, 569, 550

[56] References Cited

U.S. PATENT DOCUMENTS

| | | | |
|---|---|---|---|
| 5,050,161 | 9/1991 | Golestani | 370/60 |
| 5,132,966 | 7/1992 | Hayano et al. | 370/79 |
| 5,189,672 | 2/1993 | Le Bihan | 370/60 |
| 5,289,470 | 2/1994 | Chang et al. | 395/250 |

*Primary Examiner*—Benedict V. Safourek
*Assistant Examiner*—Dang Ton
*Attorney, Agent, or Firm*—Keck, Mahin & Cate

[57] ABSTRACT

This invention relates to the efficient use of resources in broadband telecommunications networks when handling bursty data traffic. A new technique shapes the data traffic profile to efficiently maximize the bandwidth reservation scheme whilst minimizing data loss and delay. The Fast Bandwidth Reservation Shaper (FBRS) comprises a FIFO buffer with three thresholds (T1–T3), a server, and a Fast Reservation Protocol (FRP) control function which monitors the state of the queue and its associated thresholds, alters the service rate of the server, and handles the FRP protocol. With an empty buffer, a zero or small bandwidth is allocated to the data connection. When the first buffer threshold is reached, the FRP controller attempts to negotiate a small data rate (R1) with the network. As the queue grows to the second threshold (T2), the FRP controller attempts to negotiate a higher data rate (R2), slightly larger than the peak data rate for that traffic. If the buffer completely empties, threshold (T3) will be reached and the FRP controller will clear down the allocated bandwidth to a zero or small bandwidth. The buffer size (L) and T1 and T2 can be designed to meet service parameters by guaranteeing a maximum delay and a maximum data loss probability. By careful choice of the three thresholds and service rates, the FBRS improves the efficiency of fast bandwidth allocation schemes by reducing the peak bit rate and increasing the duration of small data bursts to a guaranteed minimum that is in excess of the round trip delay.

7 Claims, 2 Drawing Sheets

ASYNCHRONOUS TRANSFER MODE DATA TRANSMISSION SYSTEM

BACKGROUND OF THE INVENTION

1. Field of the Invention

This invention relates to data transmission systems and more especially it relates to Asynchronous Transfer Mode (ATM) systems.

2. Description of the Related Art

Data traffic is inherently bursty in nature. This means that the bandwidth required for a data connection measured over the whole duration of a call may be considerably less than the peak bandwidth as measured over a much smaller time interval. The problem for the network is how to efficiently allocate sufficient resource (bandwidth) across the path of a connection without affecting the quality of service provided to other users.

The simplest resource allocation scheme is to reserve a peak bandwidth requirement across the connection path for the whole duration of the call. However, this can be very inefficient for bursty data services as the mean bandwidth requirement may be very much smaller than the peak bandwidth requirement. A scheme has been proposed which can increase the efficiency of resource allocation, namely the Fast Reservation Protocol (FRP) which has been proposed by CNET in France. This scheme calls for an in-call parameter re-negotiation technique to alter the reserved bandwidth during the period of the call. Although the FRP scheme provides many improvements over peak bandwidth allocation for efficient use of network resources, the performance and efficiency can nevertheless be degraded under certain circumstances. Degradation may particularly occur where the peak bit rate of a data burst is large with respect to a link bit rate and additionally degradation may occur where the mean burst duration is comparatively small with respect to the 'round trip delay' which is defined by the time required for a data cell to travel from a source to an 'egress node' (as hereinafter defined) and back to the source.

SUMMARY OF THE INVENTION

It is an object of the present invention to provide a system in which the foregoing short comings are obviated or at least minimized.

According to the present invention a data transmission system comprises a buffer store of predetermined maximum data capacity into which data is loaded at a predetermined rate and from which data is unloaded by a server for onward transmission, the buffer store having a plurality of threshold data capacities each threshold being defined as a predetermined proportion of the said maximum data capacity, means being provided for detecting when the data in the buffer store reaches each threshold and for increasing the rate at which data is unloaded by the server consequent upon such detection whereby the server rate is arranged to be increased in steps as the threshold capacities are successively reached, each server rate being thereafter maintained until the buffer store is emptied or until the rate is again increased.

BRIEF DESCRIPTION OF THE DRAWINGS

One embodiment of the invention will now be described by way of example with reference to the accompanying drawings, in which.

DESCRIPTION OF THE PREFERRED EMBODIMENT

Figure 1:
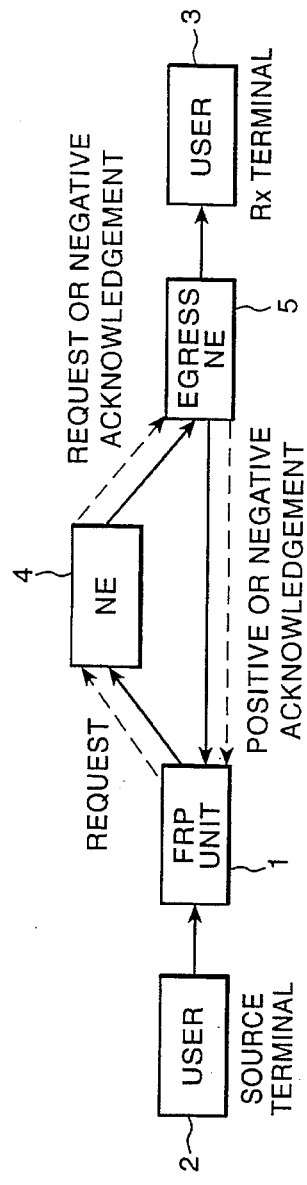
FIG. 1 is a block schematic diagram illustrating operation of a known data transmission system using an FRP unit.

Referring now to FIG. 1, a fast reservation protocol (FRP) network comprises an FRP unit 1 which is used to place a user source terminal 2 in communication with a user receiving terminal 3 via a number of network elements 4 and 5 shown schematically. The FRP network uses an in-call parameter re-negotiation technique to alter the reserved bandwidth during the period of a call. Once the data call has been set up, the FRP unit 1 associated with the user source terminal 2 can use an inband signalling mechanism to request an increase in the allocated bandwidth or to clear down some previously allocated bandwidth. Such a request is contained in a request cell which travels through the network from the source terminal 2 to every switching and multiplexing, node such as the network elements 4 and 5, to the user receiving terminal 3. At each network element an output link is interrogated to determine if the requested bandwidth is available. If it is available, that amount of bandwidth is reserved and if it is not available, the request is turned into a negative acknowledgement. A request which reaches the network element 5, which immediately precedes the user terminal 3 and which is known as a 'egress node', is turned into a positive acknowledgement and sent back to the source terminal 2 which then proceeds to transmit data at the new negotiated data rate. Reception of a negative acknowledgement by the user source terminal 2 from the network element 5 or 'egress node', will result in a further attempt to request the required bandwidth. The time required for a data cell to travel from the source terminal 2 to the network element 5 which defines the 'egress node' and back to the source terminal 2 is commonly called the 'round trip delay'.

Although the FRP network configuration just before described with reference to FIG. 1, provides many improvements over peak bandwidth allocation for efficient use of network resources, the performance and operating efficiency can be degraded under certain circumstances. The main causes for degradation are conditions when the peak rate of a data burst is large with respect to the link bit rate and conditions where the mean data burst duration is relatively small with respect to the 'round trip delay'.

Figure 2:
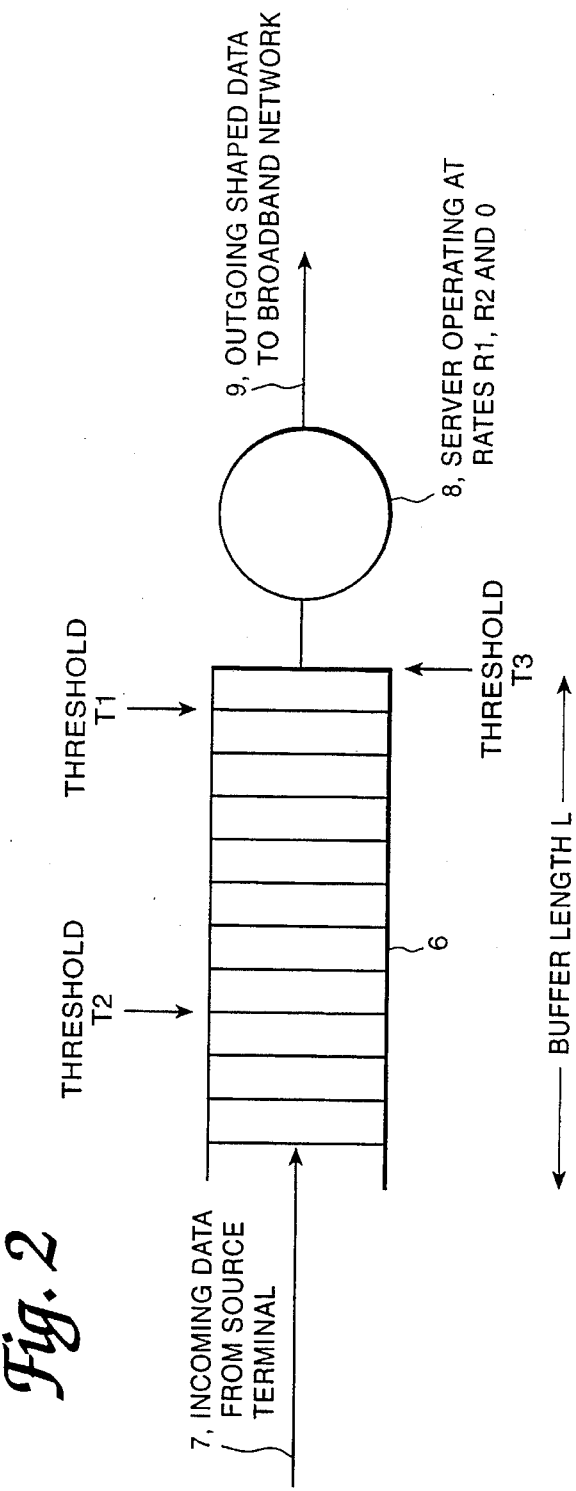
FIG. 2 is a block schematic diagram of a data transmission system according to one aspect of the present invention.

One method of improving the efficiency in accordance with the present invention is to shape the traffic profile of the data bursts to maximize the efficiency of the bandwidth reservation scheme thus guaranteeing a defined quality of service in terms of data loss and delay. One system for putting this into effect will hereinafter be described with reference to FIG. 2 and is herein referred to as a fast bandwidth reservation shaper (FBRS). As shown in FIG. 2, an FBRS comprises a buffer store 6 through which data is stepped in the direction of an arrow 7 from a source terminal (not shown) to a server 8 which feeds a line 9 which communicates with a broadband data network. It will be appreciated that if the rate of server operation is too slow, the buffer store 6 will tend to fill to capacity, and when this, stage is reached further data will be lost. In order to prevent this the buffer store 6 is arranged to have three data capacity thresholds T1, T2 and T3.

Figure 3:
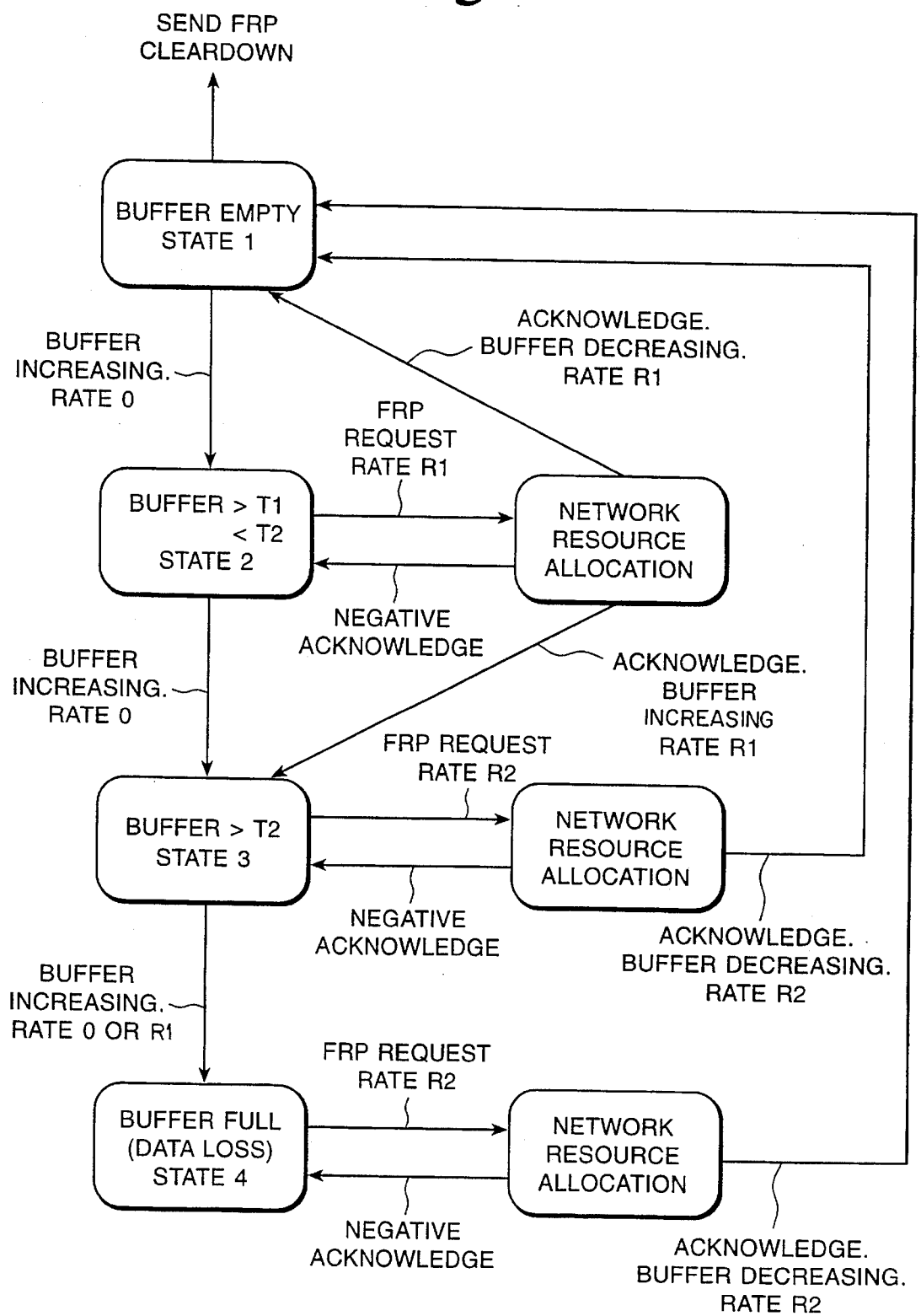
FIG. 3 is a state transition diagram illustrating operation of the system as shown in FIG. 2.

The buffer store 6 is essentially a FIFO buffer (first in first out) which operates with the three thresholds T1, T2 and T3, the server 8 and an FRP control function unit which is not shown. The FRP controller (not shown) monitors the state of the data queue and the associated thresholds and alters the service rate at which the server operates and moreover handles the FRP protocol in a known manner. In operation of the system the serving rate is increased as the data in the buffer store 6 increases to reach the thresholds T1 and T2. Operation of the system as shown in FIG. 2 will be better understood by reference to FIG. 3 wherein a modified state transition diagram is shown which shows in effect, bandwidth request and clear down algorithms. In order to simplify the diagram, the normal operation of the algorithm has been shown and some of the more unlikely transitions which may arise have not been included. The buffer 6 can be in any one of four states, i.e. empty, filled between T1 and T2, filled above T2 or full. In FIG. 3 these states are labeled as states 1 to 4 respectively. In states 2 to 4, FRP requests may be sent to the network and as a result of the network resource allocation process, either a negative or a positive acknowledgement will be received by the server 8 of FIG. 2. When the buffer 6 is empty, (i.e. in state 1), zero bandwidth, or possibly a very small bandwidth, is reserved across the path of connection. The first threshold T1 is set to correspond to a low level of data in the buffer store 6. When data enters the buffer store 6 from the source terminal 2 in the direction of the arrow 7 so that the threshold level T1 is exceeded (i.e. state 2 obtains), an FRP request is sent into the network for a low data rate R1. One 'round trip delay' later, a positive acknowledgement will normally be received by the FBRS and it is then able to start sending data out from the server 8 at rate R1. On receipt of a negative acknowledgement, the FBRS will try again by sending another request into the network.

If the incoming data rate is higher than R1, the buffer 6 will start to fill and eventually the threshold T2 will be reached such that the state 3 obtains. When this occurs, the FBRS will send another request for a higher bit rate R2, which is slightly in excess of the peak bit rate which can be achieved by the source terminal (not shown) which is feeding the line in the direction indicated by the arrow 7. Assuming that a positive acknowledgement is received after a 'round trip delay', the FBRS will then be able to send data at the rate R2.

If negative acknowledgements are continually received and the rate at which data comes into the buffer 6 is greater than the rate of the server 8, (i.e. R1 or zero), then the buffer 6 may become full such that state 4 obtains with the result that data will be lost. Even in this state, the FBRS will continue to send FRP requests into the network.

At any stage when the FBRS is able to send at the rate R2, the buffer will start to empty because the rate R2 is arranged to be slightly larger than the peak bit rate of the source. When the buffer becomes empty, (i.e. the threshold T3 is reached), a clear down message is sent to the network to clear down the reserved bandwidth to the default rate. By this process of clearing down reserved bandwidth only when the buffer is completely empty, problems of oscillation between two data rates, (i.e. rates R1 and R2), can be avoided along with the extra FRP signalling which would be required. This advantage which is afforded by the system promotes network efficiency by maximizing the burst duration and minimizing the number of changes necessary to the reserved bandwidth.

The threshold T2 can be positioned and arranged such that the buffer 6 contains enough data when it is filled up to the threshold level T2, to guarantee that a high bit rate burst, at rate R2 say, will have a minimum duration of one or more 'round trip delays'. It will be appreciated, however, that T2 must also be positioned and arranged such that a maximum length burst at the lower bit rate of R1, will not impose delays in excess of a maximum allowable delay.

It will be appreciated that the total capacity of the buffer needs to be chosen such that there is sufficient data capacity between T2 and the maximum capacity of the buffer store 6 to store data at a peak bit rate for one, or possibly two 'round trip delays'. This is required in order to reduce the probability of buffer overflow whereby data loss might unacceptably occur.

The FBRS, just before described, has a number of particular advantages including:

(a) Small duration high data rate bursts are "flattened" to form equivalent lower data rate longer bursts.

(b) For all but the smallest duration bursts a minimum burst duration greater than the 'round trip delay' can be guaranteed.

(c) The system can be used in circumstances where there is no knowledge of the 'application layer', in terms of the beginnings and ends of bursts; and (d) Bursts that closely follow one another may be merged into one longer burst.

The effect of the FBRS is to flatten data bursts so that they are longer with lower peak bandwidth, where possible, and to guarantee a minimum burst length which is greater than the 'round trip delay' for all but the smallest bursts of data. These effects mean that a fast bandwidth reservation scheme can be made to work with more efficient use of network resources for virtually all types of bursty data traffic.

As will be appreciated by those skilled in the art, various modifications (to the number of thresholds for example) may be made to the arrangement shown without departing from the scope of the invention, but in general a minimum number of thresholds would be used in a typical fast bandwidth reservation scheme, whereby the complexities of conventional signalling techniques employing multiple thresholds are avoided. Thus, a simple shaping scheme might normally be utilised relying on a single FIFO buffer having three threshold levels and a server which can operate at three fixed bit rates and an FRP controller to handle the fast bandwidth reservation. Thus, improved efficiency associated with the allocation of network resources will be afforded for all data traffic profiles such that peak bit rates are reduced where possible and a minimum burst duration is guaranteed for nearly all data bursts.

I claim:

1. A data transmission system including a fast bandwidth reservation shaper unit and comprising:

a buffer store of predetermined maximum data capacity into which data are loaded at a predetermined rate and from which data are unloaded by a server for onward transmission, the buffer store having a plurality of data capacity thresholds, each of said data capacity thresholds being defined as a predetermined proportion of said maximum data capacity; and means for detecting when the data in the buffer store reach each of said data capacity thresholds and increasing a server rate at which data are unloaded by the server consequent upon such detection so that the server rate is increased in steps as the data capacity thresholds are successively reached, each server rate being thereafter maintained until the buffer store is emptied or until the server rate at which data are unloaded by the server is again increased.

2. A data transmission system as claimed in claim 1, wherein two capacity thresholds are provided not including a buffer store full threshold or a buffer store empty threshold.

3. A data transmission system as claimed in claim 1, wherein a fast reservation protocol unit is used to control operation of the server.

4. A data transmission system as claimed in claim 3, wherein the fast reservation protocol unit includes means responsive to the data capacity thresholds being reached for increasing the server rate.

5. A data transmission system as claimed in claim 2, wherein a fast reservation protocol unit is used to control operation of the server.

6. A data transmission system as claimed in claim 3, wherein the fast reservation protocol unit includes means, responsive to the data capacity thresholds being reached, for clearing down when the buffer store is emptied.

7. A data transmission system as claimed in claim 4, wherein the means included in the fast reservation protocol unit is also responsive to the data capacity thresholds being reached for clearing down when the buffer store is emptied.

* * * * *